United States Patent [19]
Gola

[11] Patent Number: 5,454,213
[45] Date of Patent: Oct. 3, 1995

[54] METHOD AND APPARATUS FOR SHIPPING INDIVIDUAL HORTICULTURAL ITEMS

[76] Inventor: Fred J. Gola, 2214-A Lavern, Arlington, Tex. 76013

[21] Appl. No.: 276,609

[22] Filed: Jul. 18, 1994

[51] Int. Cl.[6] ............................ A01G 9/02; B65B 25/02; B65D 85/50
[52] U.S. Cl. .................... 53/474; 53/255; 53/390; 53/472; 47/84; 206/423
[58] Field of Search ....................... 53/474, 472, 473, 53/255, 390, 155, 156, 157, 238, 237, 235, 410, 111 R; 206/423, 488, 45.14, 521.6; 47/84

[56] References Cited

U.S. PATENT DOCUMENTS

| | | | |
|---|---|---|---|
| 2,605,187 | 7/1952 | Stiehm | 53/255 X |
| 3,973,356 | 8/1976 | Schacht | 206/423 X |
| 4,069,917 | 1/1978 | Stollberg et al. | 206/423 |
| 4,071,064 | 1/1978 | Saul | 206/423 X |
| 4,113,093 | 9/1978 | Hendrickx | 206/423 |
| 4,248,347 | 2/1981 | Trimbee | 206/423 |
| 4,330,059 | 5/1982 | Freeman | 206/423 |
| 4,726,468 | 2/1988 | Hesser et al. | 206/423 |
| 4,915,224 | 4/1990 | Wulf et al. | 206/423 |
| 4,936,046 | 6/1990 | Miller | 47/41.01 |
| 4,941,572 | 7/1990 | Harris | 206/423 |
| 5,029,708 | 7/1991 | Alonso et al. | 47/39 X |
| 5,205,404 | 4/1993 | Mickman et al. | 206/423 X |
| 5,224,598 | 7/1993 | Angeles et al. | 206/423 |
| 5,379,549 | 1/1995 | Carcich et al. | 206/423 X |

Primary Examiner—James F. Coan
Attorney, Agent, or Firm—Charles W. McHugh

[57] ABSTRACT

A method and apparatus for packaging horticultural items like cut flowers and potted plants for shippment in cardboard cartons is disclosed. An elongated rod extends from the top of the carton into a vase holding the horticultural items and secures the vase and horticultural from movement inside of the carton even in the event that the carton is upended.

25 Claims, 3 Drawing Sheets

FIG. 9

METHOD AND APPARATUS FOR SHIPPING INDIVIDUAL HORTICULTURAL ITEMS

FIELD OF THE INVENTION

This invention relates generally to the shipping of individual horticultural items—as contrasted with the bulk shipping of many such items; more specifically, it relates to the shipping of horticultural items such as cut flowers and potted plants, directly from a shipper to a recipient, etc., regardless of whether the shipment is across town or across the country.

BACKGROUND OF THE INVENTION

It has long been recognized that it is difficult to ship delicate and perishable items—such as horticultural items—for long distances. It is for this reason that a substantial business has grown up, namely, the business of ordering flowers from a florist at a first location and having them delivered by a second florist at a remote location. Florists who are involved in this particular part of the floral industry often advertise "Flowers Wired Worldwide," which a shorthand way of saying that the florist is a participant in a large network of florists, each of whom will deliver flowers to a recipient based upon the order of a customer who agrees to pay for the flowers at the originating shop. In practice, a customer usually selects a particular flower arrangement at a first shop, either by looking at actual arrangements or photographs in a catalog. The customer then pays for the arrangement at the first shop, expecting that an exact copy of the arrangement will be created and subsequently delivered by a second florist. The fee received by the first florist is then split with the second florists in accordance with some prearranged formula. In this manner, a customer in New York can order a particular arrangement and then have a California florist deliver it on a "local" basis to a nearby recipient. This procedure is often followed when an occasion arises in which it is customary to send flowers to someone, and there is relatively short notice to the sender—so that a person doesn't have time to write or make lengthy negotiations about quality, quantity, delivery schedules, or price. Examples of these occasions include births, deaths, major accomplishments, marriages, promotions, and reaching goals that have been long sought after (such as graduating from a school or obtaining one's pilot's license).

Of course, these long-distance business arrangements have the potential for several kinds of problems, some of which are more or less self-imposed by people in the industry. A customer in New York may never get to talk directly to the florist in California; rather the New York customer often talks only to the New York florist, and then the two florists talk with one another, using whatever "insider" language is pertinent for communicating the order, etc. And, of course, a great deal of trust must exist in this kind of situation; the New York customer must have the confidence that the money that is being paid in New York will somehow produce a flower arrangement in California that matches the expectations that were hatched in New York. But even if the quantity, color, style and quality of cut flowers or plants turn out to be what was expected, there is always the problem of sending along a card, letter or personal greeting. Messages from a sender to a recipient often have to be kept short and simple, because the message that is dictated where the flowers are ordered must eventually be transcribed where the flowers are to be delivered. Names like "Marianne" in New York can accidentally turn out to be "Mary Ann" in California etc. And a marriage proposal dictated in one place may not be quite as romantic if the local florist who is delivering the flowers never graduated from penmanship school and has to print the message.

It follows, therefore, that there has existed a long-felt need for a person to be able to select in a first place the exact flower arrangement that is to be delivered to a recipient at a remote place—perhaps even all the way across the country. And there has also existed a need to be able to personally script a message that will arrive with the flowers that constitute the featured attraction for a dramatic message. Fortunately, there has arisen over the past several years a means for effecting delivery of things on a rapid basis, whether from city to city or state to state. Delivery services such as Federal Express, United Parcel Service, Airborne Express and others have now essentially perfected their ability to move packages across the country in a short period of time—often overnight. So if a way could only be devised to safely package flowers and other horticultural items, at least procedures are already in place in the United States to quickly deliver those items, so that they would not dry out and/or deteriorate while they are in transit.

It is not meant to suggest, however, that no attention has been devoted to the packaging and shipping of cut flowers and other horticultural items. Indeed, there has been significant effort in this field, and several U.S. patents have issued to various inventors on their respective designs. For example, U.S. Pat. No. 4,936,046 to Miller entitled "Horticultural Transport Receptacle" teaches a combination that functions both as a shipping container and a display device, once the container has arrived at its destination. U.S. Pat. No. 4,941,572 to Harris entitled "Method and Package for Fresh Cut Flower Arrangements and Plant" discloses a very sophisticated package for shipping flowers and a vase, provided that the vase has an external configuration that is compatible with the special die cut cardboard pieces that fit inside the package. And U.S. Pat. No. 5,224,598 to Angeles et al. entitled "Plant Package" discloses a multi-compartment container with different degrees of permeability and vapor transmission, so that a plant or the like might last several days in shipment provided that a trained person is responsible for correctly effecting the necessary seals, etc.

It is an object of this invention, however, to provide a shipping container and method of using it that does not rely on sophisticated vapor barriers and like, so that a plant might last for many days. Instead, the invention to be disclosed herein relies on the speed of an already established delivery system to quickly get a shipping container to its destination, and provides a mechanism to protect the item being shipped from the effects of what might politely be called a less-than-delicate handling style. That is, if there were suitable trucks or air freight containers that were designed for shipping individual boxes of flowers, and if those carriers were criss-crossing the country every night, and if the persons handling those boxes were all gentle spirits, then it might be possible to ship flowers without concern about their arrival condition. But it is not a perfect world. And if we had any hope that a flower container would arrive at its destination without having been bumped, jostled, shaken and even turned upside down, a brief visit to a regional shipping depot might give us cause for concern. So recognizing that bad things can happen to good packages, it is an object of this invention to compensate for the possibility that bad things may happen, and to create a shipping container that will take accidental abuse and still make the trip with its contents intact.

It is another object to create a shipping container for horticultural items that can be purchased and used by essentially anyone, including those who do not have either special dexterity or special tools.

A further object is to provide a shipping container that can be used with a wide variety of vases, to increase the opportunities for a purchaser who is looking for just the "fight" vase to match just the fight floral arrangement.

These and other objects will be apparent from the description below, together with reference to the several figures of the drawing that are provided herewith.

BRIEF DESCRIPTION OF THE INVENTION

In brief, the invention involves use of a container that is large enough to readily envelop the horticultural element that is to be shipped, and sturdy enough to resist the normal bumps and jolts that can be expected when using companies that are currently in the business of providing rapid shipping services. Those companies include Federal Express, United Parcel Service (frequently abbreviated UPS), Airborne Express, etc., and they are almost all characterized by offering overnight delivery to most places in the United States. While their fees may be higher than the fees charged by the United States Postal Service for routine parcel post service, they are motivated to provide fast service. Because these companies routinely carry such a large volume of boxes and other containers, and they are expected to deliver the them promptly, it is not logical to also expect their workers to handle all of their shipments with the same kind of slow, delicate care that we might expect a grocery store clerk to devote to a carton of fresh eggs. It follows, therefore, that we can more reasonably expect a worker to handle a package more quickly than softly, and we should plan our packaging strategy to deal with the realities of the shipping business. A double-faced corrugated cardboard box having a bursting strength of about 200 pounds per square inch can serve nicely to envelop the horticultural item that is to be shipped.

Of course, such "cardboard" containers are not new; they have been widely used for shipping a wide variety of items for years. But what is new in this particular shipping system is that the horticultural item will not be damaged if a shipping container is turned on its side—or even upside down (i.e., on its top). This is because the horticultural item is expected to be shipped in a vase, bowl, pot or other conventional holder with a rigid bottom and an open top; and there is also provided an internal support structure that prevents the open-top holder from moving if and when the shipping container is turned on its side or inverted. (For convenience, the single word "vase" will hereinafter be used as a generic way of referring to all such open-top holders, without regard to whether they have been designed to be cosmetically pleasing or simply functional.) The preferred form of an internal support constitutes an elongated member such as a rod, said rod having the rigidity and strength to vertically support a vase—if the vase should happen to be accidentally inverted. While strength and rigidity are important, the elongated member must not be so bulky as to constitute a threat to the horticultural thing being shipped. A good compromise between strength and compactness has been found to be a wooden dowel having a diameter in the range of about 5/16 inch to about 1/2 inch.

In addition to the elongated member, there is provided a connecting member (also sometimes called a cap or clip) that fits on the top of the elongated member and engages a spacer whose purpose is to ensure that the elongated member will remain in the center of the shipping container at all times. A suitable spacer can be advantageously made out of the same material as the shipping container, i.e., double-faced corrugated cardboard. An optimum spacer will have a shape and size so that it will fit snugly inside the shipping container, and it will have a central aperture that is configured to engage the elongated member—either directly or through the connecting member. A lower spacer (made of cardboard or the like) may also be used to prevent the vase from sliding sideways if the shipping container should be accidentally placed on its side during shipment.

DETAILED DESCRIPTION OF A PREFERRED EMBODIMENT OF THE INVENTION

Figure 1:
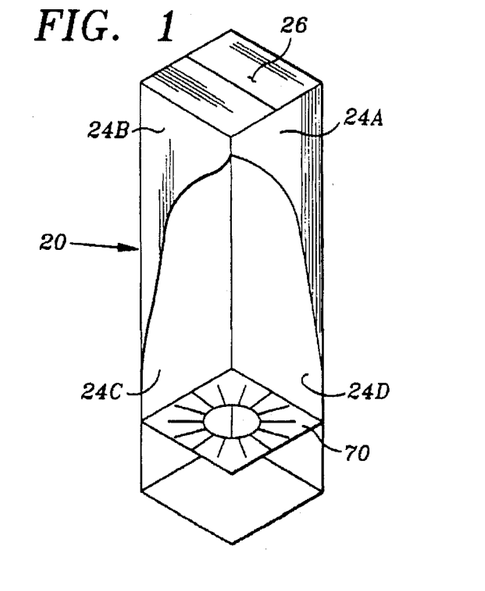
FIG. 1 is a perspective view of a shell-like shipping container in accordance with the invention, with parts of the side walls cut away to facilitate the showing of certain internal parts, and shown without flowers (for simplicity)
Figure 2:
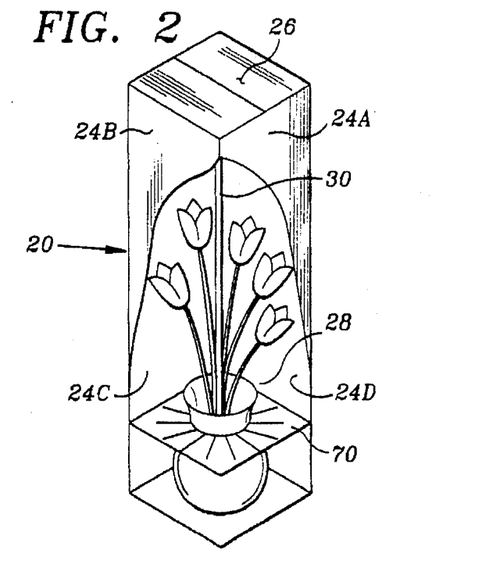
FIG. 2 is a perspective view similar to FIG. 1, but showing an arrangement of cut flowers in a vase—all positioned within the shipping container.

Referring initially to FIGS. 1 and 2, a shipping container 20 in accordance with this invention is shown in its normal, upright mode. The container 20 is sufficiently stiff as to be self-supporting, and is shown as a rectangular parallelepiped—with a bottom 22, four sides 24A, 24B, 24C and 24D, and a top 26. However, the shape of the container is not critical, and, instead of being square, the transverse cross section of the container could be in the shape of a triangle, hexagon, octagon, etc. The external shape could also be that of a cone, pyramid, etc.; however, those in the shipping business will normally have a preference for "boxy" packages, because it is easier to stack a plurality of them in a compact space. It can be anticipated that if a shipping container is to offered for sale by Federal Express or some other shipping company (as a convenience to its customers), that container will likely be a rectangular parallelepiped. Of course, one thing that is important is that there be a relatively easy way for someone to insert and remove an horticultural item; so the container should be selectively closable with relative ease.

The container 20 has several purposes, including providing a means for carrying an horticultural item (e.g., flowers) in a vase 28 without touching the flowers or exposing them to wind, rain, dust, etc. This is particularly significant if the container must be carried outdoors, including traversing whatever unprotected distance may exist between a delivery truck and the intended recipient. For purposes of the description to follow, the horticultural item will be described as flowers, although it will be understood that the shipping device and method described herein will be equally effective with potted plants and other living items that heretofore have been difficult for a person to ship. The container 20 also provides a relatively rigid shell into which may be placed a structurally flimsy but moisture-proof wrapping (e.g., a thin plastic wrap) for the purpose of controlling the surrounding moisture that is desired for flowers during shipment. To this end, the container 20 is preferably created by folding and then connecting together panels of double-faced corrugated cardboard, to create what many people refer to as simply a cardboard box. Depending on the size of the flower arrangement that is to be shipped, a box formed from single-wall panels having a bursting strength of 200 pounds per square inch will normally be quite adequate. On the other hand, a heavy-duty model with double-wall panels may provide peace of mind to those persons who are planning to ship a vase 28 that is unusually heavy (or valuable) all the way across the country, etc.

Shown in the center of the container 20 is a relatively stiff elongated member 30 whose length is essentially the same as the distance between the container's bottom and top. Of course, the selected vase will have a base with a thickness that can be measured or at least estimated. Depending on the thickness of the base in which the flower arrangement is to be shipped, a person who is packing flowers for shipment may choose to cut off a small section of the elongated member 30, to physically shorten it by a small amount. However, having an elongated member 30 that is a small fraction of an inch too long will normally not be a problem, because creating a slight bow in the elongated member 30 during installation will serve to store a small amount of potential energy in the member as it is squeezed into a space that is just a little too short. Any such temporary deformation of an elongated member 30 will help ensure a tight, stable package for shipping. The material from which the member 30 is fabricated is preferably sturdy, clean, non-toxic and susceptible to being reused or recycled. A widely available and economical material for an elongated member 30 is a wooden dowel having a length of, say, 18 to 30 inches, and having a diameter within the range of about 5/16 inch to about 1/2 inch. A preferred material for a wooden dowel is birch, because it is relatively hard and strong, and a birch dowel will tend to hold dimensional tolerances better than many woods. A preferred diameter for a birch dowel is 3/8 inch; such a dowel will have sufficient rigidity and strength to hold essentially any vase against the force of gravity if and when the container 20 is accidentally turned upside down during shipment.

Figures 3, 4, 5:
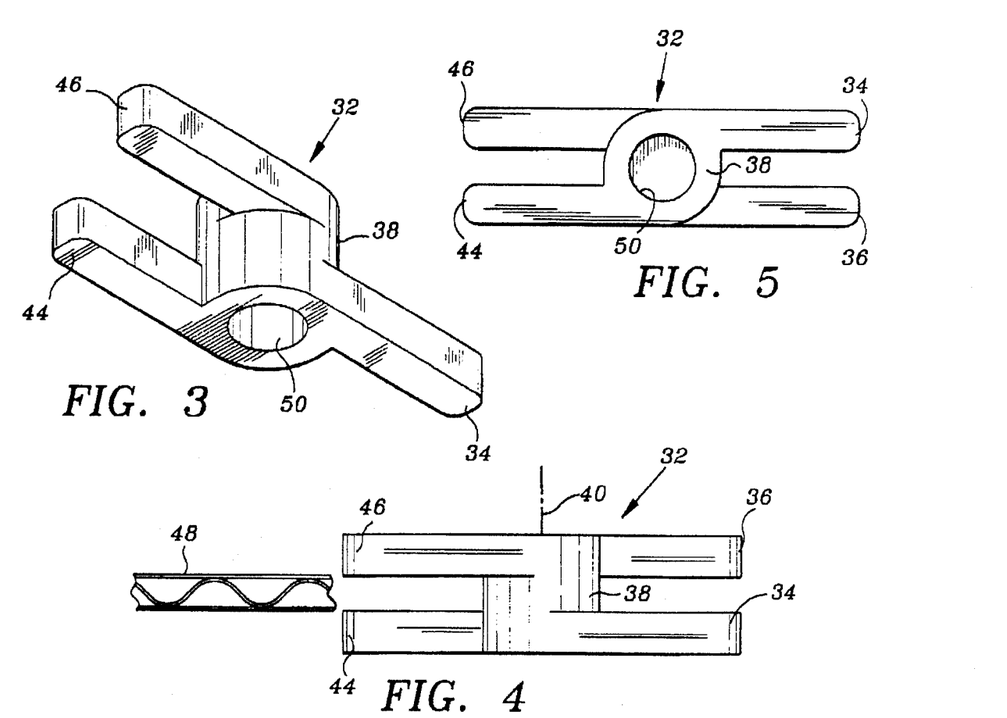
FIG. 3 is a perspective view of a clip or cap that can be placed at the top of a dowel for holding the dowel in a centered position with respect to the shipping container.
FIG. 4 is a side elevational view of the clip shown in FIG. 3, showing the upper and lower arms that are spaced apart for a distance that is appropriate for capturing a piece of double-faced corrugated cardboard therebetween.
FIG. 5 is a bottom plan view of the clip shown in FIG. 3, showing the circular recess that is sized for receiving the top end of a wooden dowel.

Also shown at the top of the container 20 is a clip 32 that is used to secure the elongated member 30 at the top of the container. Referring additionally to FIGS. 3, 4 and 5, a preferred form of a molded plastic clip 32 is shown. This device 32 constitutes a part of a means for maintaining the elongated rod 30 in a desired position with respect to the container 20 at all times; it cooperates with a piece of double-faced corrugated cardboard that serves as a spacer within the container. Referring in particular to FIGS. 4 and 5, a pair of cantilevered legs 34, 36 extend in a cantilevered manner away from a generally cylindrical body 38. A second pair of legs 44, 46 extend from the body in an opposite direction from the first pair. Both pairs of legs 34, 36, and 44, 46 are separated in a vertical direction, with vertical being indicated by the axis 40 in FIG. 4. The purpose of the vertical separation is to provide a gap into which may be forced the aforementioned piece of double-faced corrugated cardboard. So when a single thickness of such cardboard is to function as the transverse spacer, indicated in FIG. 4 by the fragmentary piece 48, then an appropriate separation distance is about 0.225 inch—or less. A separation distance slightly less than the conventional thickness of single-panel cardboard can be advantageous, because corrugated cardboard can be manually squeezed (i.e., slightly crushed) so that it will fit into a space that is more narrow than its nominal height. And slight deformation of the spacer 48 will help ensure that the clip 32 will be less likely to vibrate out of its desired spatial position during shipment of the container 20.

Cantilevered legs 14, 46 extend away from the body 38 for a distance that is essentially the same as legs 34, 36, that is, about one inch. By making both sets of legs the same size and shape, the clip 32 can be inserted into a die cut hole in spacer 48 without regard to any particular orientation. That is, a Z-shaped hole in spacer 48 will accept a clip 32 that is turned in either a first direction or 180 degrees from that first direction. The Z-shaped appearance of a clip 32 is, of course, established by the co-planar legs 34, 44 and 36, 46, which is perhaps best illustrated in FIG. 5. Also shown in this figure is the vertical bore 50 that extends downwardly into the center of body 38, for tightly receiving the top of elongated rod 30. So if the rod has a diameter of 3/8 inch, the bore 50 will have a matching diameter. By putting a mechanical element like clip 32 on top of rod 30, any vertical loading that may be applied through the rod will be distributed through an area that is significantly larger than the transverse cross-sectional area of the rod. So if a shipping container 20 should be accidentally inverted during shipment, any load imposed on the top 26 by the weight of an inverted vase 28 will be widely distributed by the cap-like element 32.

Figure 6:
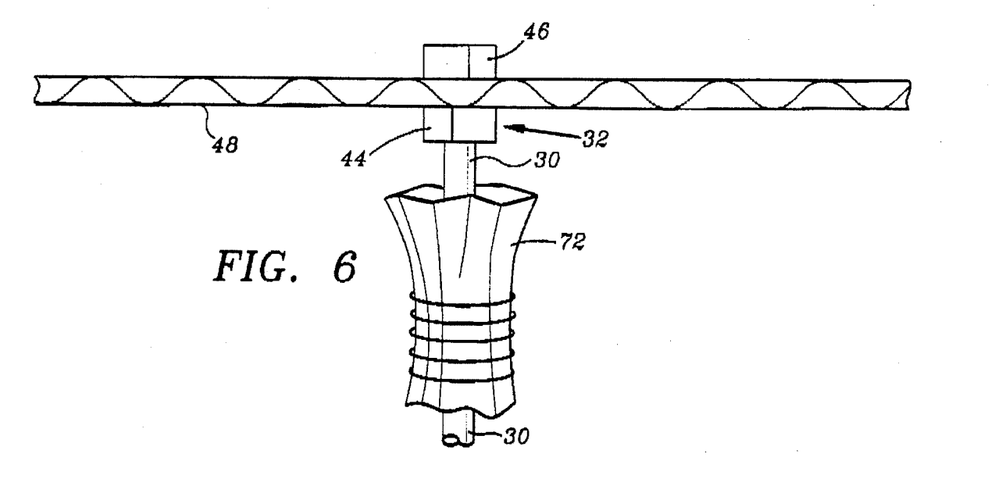
FIG. 6 is a fragmentary elevational showing of a clip, dowel and cardboard spacer in their assembled condition at the top of a shipping assembly, with a plastic wrapper being tied around a top portion of the dowel.

The configuration established for the clip 32 lends itself well to fabrication using injection molding techniques for plastics such as polypropylene, and this may be considered to be the preferred material for the clip. However, it is the function of the clip 32 (which is new) rather than its material (which is old) that is deserving of the most attention. Turning next to FIG. 6, this function will be treated in more detail. This fragmentary showing of the top portion of the apparatus includes the elongated member 30, a clip 32 and a central portion of the cardboard spacer 48. The clip 32 is shown in what will be called its fully rotated position, i.e., the position it assumes after it has been pushed half-way through a Z-shaped opening in the spacer 48 (which opening is the same shape and size as the three elements 34, 38 and 44 in FIG. 5) and then rotated by several degrees. Indeed, to more nearly guarantee the maximum engagement between a clip 32 and a spacer 48, a user may be encouraged to rotate a clip by a full 90 degrees, even though rotation by a mere 10 degrees or so will normally be sufficient to preclude withdrawal of the clip out of the same spacer hole that it went into easily. Of course, the cylindrical exterior of the body 38 makes rotation of the clip 32 with respect to a cardboard spacer a very easy thing to do without the requirement for any hand tools, etc.

Once the clip 32 and the spacer 48 have been engaged, the clip and any rod that is mated with the clip can be held against any significant movement in a direction that is perpendicular to the rod, provided that the spacer is sized to fit snugly inside the top portion of the container 20. So, if the interior of a preferred container 20 is in the shape of a square whose sides are 12 inches long, the spacer 48 will also be in the shape of a similarly sized square. The perimeter of the 12 inch by 12 inch spacer 48 will then bear against the inside surfaces of the walls 24A, 24B, 24C and 24D, thereby holding the rod (and any flowers attached to the rod) against any side-to-side (or transverse) movement. An alternate embodiment of the invention uses cooperating hook-and-loop fasteners to secure the top of a rod 30 to the container's top 26, to obtain similar restraint against side-to-side movement. However, experimentation has shown that an unprotected rod can pierce the top of a container if a heavy vase is in the container and it is dropped from a height of four feet or more. So expanding the effective pressure area of the rod's end by coveting said end with a clip 32 seems to serve two purposes in an economical and simple manner. That is, a clip 32 as shown in FIG. 3 can work to prevent sideward movement of a rod and also help preclude that rod from piercing the container top in the event that the container is accidentally dropped while it is inverted.

Figure 7:
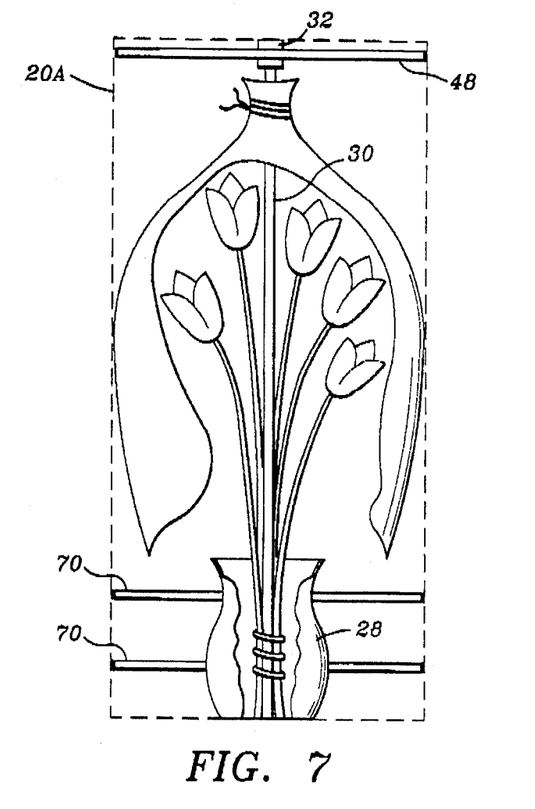
FIG. 7 is an elevational view of the internal parts of a shipping assembly in their upright condition, with an exemplary plastic wrapper being partially broken away to reveal a flower arrangement inside the wrapper, and an exemplary vase being partially broken away to reveal the bottom of the dowel in contact with the base of the vase.

Turning next to FIG. 7, there are shown the internal parts of a shipping assembly in an upright manner, with a typical external shell or container 20A being shown in broken line. It will seen that this particular container 20A is what may be described as a front-loading rather than a top-loading box. That is, if the top of a container is to given its identity based upon where the top of the flower arrangement is, then the top of this container 20A is designed to be closed at all times; one of the container's four sides (here called the front) is selectively opened to receive the flowers, and then subsequently closed and sealed with tape to prepare the container for shipment.

For purposes of discussion, it will be assumed that a customer wishes to send a flower arrangement to a favorite aunt in a remote state. The occasion is the aunt's birthday, and the customer has also found a beautiful Blue Willow vase in an antique store; it is believed that the vase will give the aunt great pleasure, especially when filled with her favorite flowers. So the customer takes the antique vase to a local florist, who works with the customer to select just the right arrangement of flowers to complement the classical blue and white colors in the vase and satisfy an exacting taste. There will be no doubt in the customer's mind about either the selection of flowers or their freshness, because the customer will be observing the very flowers that are to be in the aunt's hands the next day. Once the arrangement has been established, the florist will vertically insert an appropriately sized rod 30 into the arrangement, being careful—of course—to pass alongside the stems of the flowers without damaging them. The entire arrangement is then carefully removed from the vase, and the flowers are secured to each other, and to the lower portion of the rod 30, using one or more rubber bands or florist's wire. This step facilitates putting the arrangement back together again in the vase, in exactly the same order in which they were once placed.

While it is expected that the floral arrangement will be delivered the very next day, there is a remote possibility that something may delay the shipment. Too, the customer will naturally want the arrangement to last for an extended period of time after it has been received. To this end, the florist may want to add a wet sponge or a packet of moist nutrients, etc., at the bottom of the floral stems, and secure them together inside one or more sheets of floral wrapping paper. Attention is then turned to the vase and its anticipated placement with the container 20A. With this shipping method, a vase of essentially any size or breadth can be accommodated, merely by taking a piece of essentially any double-faced corrugated cardboard and cutting a central hole that will just slip around the exterior of the vase. An exemplary piece of cardboard 70 is shown in FIG. 7; in a position where it can hold the vase against sideward movement away from a rest position in the bottom of the container. To increase the side-to-side stability of the vase, a pair of vertically spaced panels 70 may be advantageously placed around the vase, and wedged into the container. And, of course, any desired amount of cushioning can be placed under the vase to render it immune to shock, vibration, etc., during shipment.

Perhaps it would be useful to mention at this point that what is being described here constitutes a significant improvement over those shipping containers of the prior art that will only work with a very narrow class of vases, i.e., those vases that include a narrow pedestal or some other irregular shape that can be grabbed with wires, rubber bands or cardboard. With this system, the rod 30 performs the function of keeping a vase 28 from bouncing away from the floor of the container 20 during shipment; so all that a cardboard brace 70 need do is help secure the vase against any significant movement in a direction that is perpendicular to the rod. And it is believed that essentially any florist with a sharp knife can readily make whatever cuts may be necessary to convert an ordinary piece of cardboard into a suitable sideward brace 70 for holding a vase 28 in a container. But to make the assembly even more user friendly, a so-called starburst pattern can be pre-cut in the center of a cardboard panel 70 that is furnished with a flower-shipping kit; the radial "leaves" of the pattern can then be bent by the user, as necessary, to accommodate a vase 28 of essentially any shape.

After the vase 28 has been placed in the bottom of the container 20, the flower arrangement and its associated rod 30 can be placed back into the vase. The floral paper or any desired moisture-proof paper is then brought together near the top of the rod 30 and secured to the rod with wire or the like. A clip 32 is then pushed half-way through a spacer 48 and rotated to effectively lock the two into a unit. This sub-assembly is now ready to be put into a shipping container. The spacer 48 is then inserted into the upper portion of the container 20 until it has become securely wedged therein, while the clip 32 and the rod 30 remain engaged. A personal message from the customer may then be written and dropped inside the container 20, where the message will be found by the recipient the next day, along with personally selected flowers and a special vase. The container 20 is then closed, and a telephone call is then placed to the overnight delivery service that has promised to provide the kind of service that the customer wants.

Figure 8:
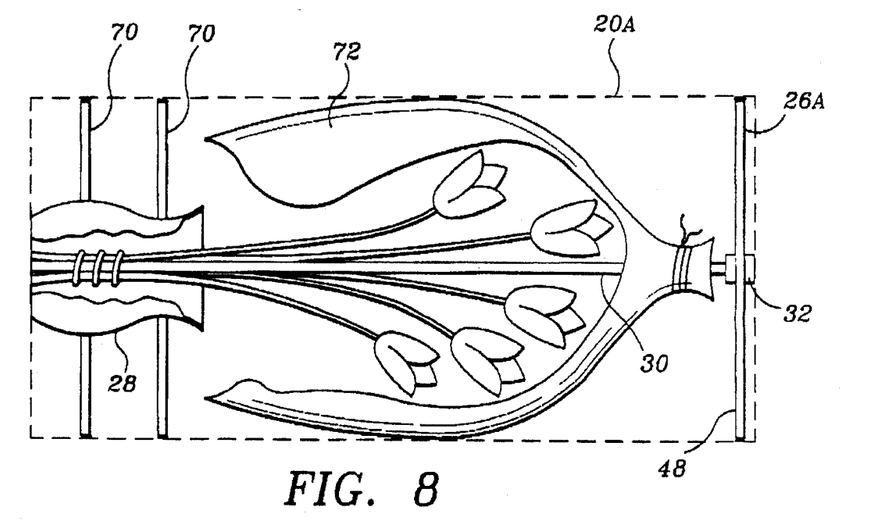
FIG. 8 is an elevational showing of the internal parts of the shipping assembly of FIG. 7 in the condition in which they would exist if the shipping container were to be accidentally knocked over during shipment.
Figure 9:
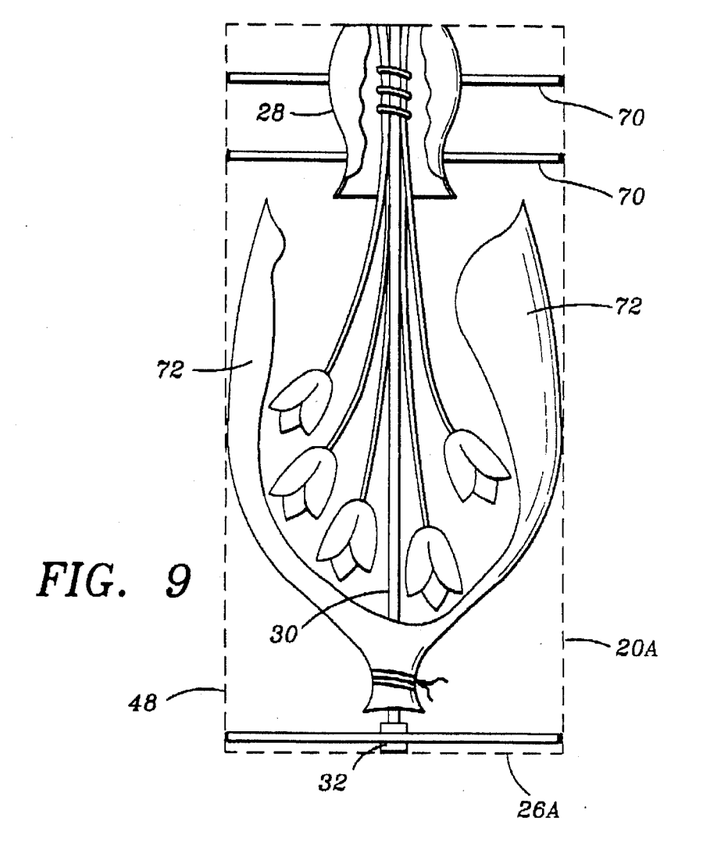
FIG. 9 is an elevational showing of the internal parts of the shipping assembly of FIG. 7 in the condition in which they would exist if the shipping container were to be accidentally placed upside down during shipment.

If desired, the exterior of the container 20 may be provided with a large label that says something to the effect of "THIS SIDE UP." But even if the container is turned on its side, as shown in FIG. 8, the entire assembly is essentially as secure as it was when it was upright. The flexible wrapping paper 72 will help keep the heads of the flowers from falling away from a centered position in the container, and the combination of the spacer 48 and the brace 70 will keep everything else in their proper position. If during the trip the container 20 experiences the indignity of accidentally being turned upside down, as shown in FIG. 9, there is still no threat to either the flower arrangement or the vase. The vase 28 is rigid, of course, and it will be held in its inverted position by the rod 30; and the flowers are secured to the rod by tie wires or the like, so nothing moves. And when the container 20 has been received at its destination, the top 26 is simply opened and the arrangement is lifted out. The flexible floral paper is cut away and the rod 30 is removed, leaving in the recipient's hands an arrangement of flowers that may have been hundreds of miles away the day before.

Besides offering people a more personal way of selecting and sending flowers to remote locations, the shipping method described herein allows a person to cut flowers from their own garden and ship them to friends and relatives. As for "store-bought" flowers from a local florist, there will no longer be any need to speculate about the condition and color of flowers that will be received—even if the intended recipient is several states away. A local florist may also benefit financially from the shipping method described herein, in that there will no longer be a need to split a fee for flowers that are ordered at one location but actually handled at another location. A complete assembly for shipping flowers and other horticultural items in accordance with this invention will typically weigh about two pounds, if the container has a base of 12 inches by 12 inches, and a height of 24 inches. So the actual shipping expense should not be too burdensome. And in the same manner that Easter and Mother's Day are already two of the busiest business days for telephone companies, those same two days may soon become even busier days for overnight shipping companies.

While only the preferred embodiment of the invention have been disclosed herein in great detail, those skilled in the art will recognize that certain changes and alterations might be made without departing from the spirit of the invention. For example, a molded plastic element or rod may be used as the vertical-support member—instead of the birch dowel that has been described herein as the preferred support device. And specially shaped shipping containers may be readily substituted for the standard shapes and sizes that have been illustrated, etc. Therefore, the scope of the invention should be understood to be limited only by the claims that are appended hereto.

What is claimed is:

1. An apparatus for shipping a horticultural item selected from the group that includes cut flowers and potted plants, and each selected horticultural item consisting of an upper portion and a lower portion, comprising:

a) a rigid vase having a base and side walls that extend upwardly from the base when the vase is oriented fight side up, and the vase having a top opening that is sized to receive and support the lower portion of an horticultural item;

b) a relatively stiff outer shell having a size that is adequate to envelop the combination of an horticultural item and the vase, and the outer shell having a top and a bottom and a generally vertical axis that extends between the shell's top and bottom when the shell is oriented in an upright manner;

c) means for securing both the vase and the horticultural item against falling if and when the outer shell is temporarily turned upside down, said means including an elongated rod that is in contact with the vase, and the elongated rod functioning as a vertical support for the temporarily inverted vase if and when the outer shell is ever turned upside down; and d) means for maintaining the elongated rod in a desired position with respect to the outer shell at all times.

2. The apparatus for shipping a horticultural item as claimed in claim 1 wherein the elongated rod extends vertically above the center of the vase when the vase is oriented fight side up, such that the rod may pass centrally through the horticultural item, and further including a flexible wrapping element that passes around the horticultural item and is secured to a top portion of the elongated rod.

3. The apparatus for shipping a horticultural item as claimed in claim 1 wherein the elongated rod constitutes a wooden dowel having a diameter no greater than ½ inch.

4. The apparatus for shipping a horticultural item as claimed in claim 1 wherein the outer shell constitutes a rectangular parallelepiped formed from double-faced corrugated cardboard.

5. The apparatus for shipping a horticultural item as claimed in claim 1 wherein the outer shell has a top and a bottom, and the elongated rod has a transverse cross-sectional area, and farther including means for transferring a vertical load between the elongated rod and the top of the shell if and when the shell is ever inverted, and said vertical load being transferred over an area that is greater than the cross-sectional area of the elongated rod.

6. An apparatus for shipping a horticultural item selected from the group that includes cut flowers and potted plants, and each selected horticultural item consisting of an upper floral portion and a lower portion, and the horticultural item's lower portion being positioned in a relatively rigid vase, comprising:

a) a selectively closable and relatively stiff outer shell having a size that is adequate to envelop the combination of an horticultural item and a relatively rigid vase, and the shell having a top and a bottom and a generally vertical axis that extends between the shell's top and bottom when the shell is oriented in an upright manner;

b) means for holding the vase against movement away from a desired rest position at the bottom of the shell when the shell is oriented in an upright manner;

c) an elongated member having first and second ends and having a length between the two ends that is sufficient to extend between essentially the shell's top and bottom, and the member's two ends being aptly described as top and bottom ends when the elongated member is oriented in a generally vertical manner, and the member's bottom end being small enough to fit into the vase, and the elongated member having sufficient rigidity and strength to hold the vase against the force of gravity if and when the shell is accidentally turned upside down during shipment, whereby temporarily inverting the shell and thereby inverting the vase will cause the elongated member to function as a vertical support for the temporarily inverted vase, and whereby an accidentally inverted vase will not fall downwardly onto the temporarily upside-down horticultural item;

d. means for securing the horticultural item against falling if and when the shell and the vase are temporarily turned upside down; and e. means for maintaining the elongated member in a desired position with respect to the shell at all times.

7. The shipping apparatus as claimed in claim 6 wherein the relatively stiff shell is fabricated from double-faced corrugated cardboard.

8. The shipping apparatus as claimed in claim 6 wherein the elongated element constitutes a wooden dowel.

9. The shipping apparatus as claimed in claim 8 wherein the wooden dowel is generally cylindrical and has a diameter of about ⅜ inch.

10. The shipping apparatus as claimed in claim 6 wherein the shell constitutes a generally rectangular parallelepiped.

11. The shipping apparatus as claimed in claim 10 wherein the shell has a base with four essentially equal sides, and the shell has sidewalls that extend upwardly from the base when the shell is normally oriented in an upright manner, and the sidewalls extend upwardly for a height that is substantially longer than the base's sides.

12. The shipping apparatus as claimed in claim 11 wherein the sides of the base are approximately 12 inches in length and the height of the sidewalls is within the range of about 18 inches to 30 inches.

13. The shipping apparatus as claimed in claim 6 wherein said means for maintaining the elongated member in a desired position with respect to the shell includes a piece of double-faced corrugated cardboard with a die-cut hole therein, and further including a mechanical element that is shaped to pass partially through and thereby become engaged with the die-cut hole of the corrugated cardboard.

14. The shipping apparatus as claimed in claim 13 wherein the mechanical element includes at least one pair of cantilevered legs, and the pair of cantilevered legs extend radially outward from the elongated member at a time when the mechanical element and the elongated member are engaged, and said at least one pair of cantilevered legs are spatially separated in a vertical direction by a distance that is no greater than the thickness of the double-faced corrugated cardboard with which the mechanical element is engaged.

15. The shipping apparatus as claimed in claim 14 wherein the mechanical element has a Z-shaped configuration when viewed from above.

16. The shipping apparatus as claimed in claim 14 wherein the mechanical element has two pairs of cantilevered legs, and each pair of legs is offset with respect to the other pair when the element is examined in a direction that is parallel to the longitudinal axis of the elongated element.

17. The shipping apparatus as claimed in claim 6 wherein the means for holding the vase against movement away from a rest position includes a panel of double-faced corrugated cardboard that has a central opening, and said central opening being sized to contact and support the exterior of the vase, and said panel of corrugated cardboard having a periphery that is sized and shaped so as to bear against the interior walls of the shell.

18. The shipping apparatus as claimed in claim 6 wherein said means for securing the horticultural item against falling includes a mechanical means for securing the item's lower portion to the bottom of the elongated member before the elongated member is inserted into the vase.

19. The shipping apparatus as claimed in claim 6 wherein the means for maintaining the elongated member in a desired position with respect to the shell includes a molded plastic element that is selectively engageable with the top end of the elongated member without requiring the use any hand tools.

20. The method of shipping the combination of a horticultural item and a vase inside a relatively stiff shell-like container, said horticultural item being selected from the group that includes cut flowers and potted plants, and the shipping being in a manner that precludes injury to the horticultural item if and when the container should accidentally be turned upside down during shipment, comprising the steps of:

a) selecting a rigid vase with an open top into which the bottom of an horticultural item may be inserted;

b) securing the horticultural item in the vase;

c) providing a container having a relatively rigid top and bottom, and the container being tall enough to envelop both the horticultural item and the vase while said horticultural item is resting in the vase at the bottom of the container;

d) providing a relatively stiff and narrow elongated member, said member having upper and lower ends and a length therebetween, and the member's length being long enough to extend longitudinally from essentially the bottom of the container to the top thereof; and e) inserting the elongated member into the vase, and inserting the combination of said elongated member, said horticultural item and said vase into the space between the container's top and bottom, whereby the vase and the horticultural item will be held in an inverted position by the elongated member if and when the container is ever inverted—by virtue of passing the weight of the horticultural item and the vase as a vertical load through the elongated member to the bottom of the container.

21. The method as claimed in claim 20 and including the further step of securing the elongated member against any unwanted movement with respect to the container in a direction that is perpendicular to the longitudinal axis of the elongated member.

22. The method as claimed in claim 21 wherein the elongated member is secured against any unwanted movement with respect to the container by holding it with respect to the container at two regions, and one of said regions being near the top of the container and the other being near the bottom of the container.

23. The method of shipping the combination of a horticultural item and a vase inside a relatively stiff shell-like container, said horticultural item being selected from the group that includes cut flowers and potted plants, and the shipping being in a manner that precludes injury to the horticultural item if and when the container should accidentally be turned upside down during shipment, comprising the steps of:

a) selecting a rigid vase with an open top into which the bottom of an horticultural item may be inserted;

b) providing a container having a relatively rigid top and bottom, and the container being tall enough to envelop both the horticultural item and the vase while said horticultural item is resting in the vase at the bottom of the container;

c) providing a relatively stiff and narrow elongated member, said member having upper and lower ends and a length therebetween, and the member's length being long enough to extend longitudinally from essentially the bottom of the container to the top thereof;

d) attaching the bottom of the horticultural item to the lower end of the elongated member;

e) inserting the bottom of the horticultural item and the bottom of the elongated member into the vase;

f) placing into the container the combination of the vase, the horticultural item and the elongated member, and said placing being done in such a way that the elongated member will be wedged between the vase and the top of the container;

g) securing the vase within the container in such a way that it is precluded from any significant movement in a direction that is perpendicular to the elongated member; and h) securing the top of the elongated member at the top of the container in such a way that the top of the elongated member is precluded against any significant movement in a direction that is perpendicular to the elongated member, whereby accidentally turning the container on its side will result in the horticultural item and the vase still being supported, and whereby accidentally turning the container upside down will result in the transfer of the weight of the horticultural item and the vase through the elongated member to the original top of the container.

24. The method as claimed in claim 23 wherein the step of securing the top of the elongated member within the container in such a way that it is precluded from any significant movement in a direction that is perpendicular to the elongated member includes the step of mechanically connecting the top of the elongated member to a support piece that fits snugly within an upper portion of the container.

25. The method as claimed in claim 24 wherein the step of mechanically connecting the top of the elongated member to a support piece involves the step of inserting a mechanical element partially through the support piece and then rotating the mechanical element by an angle that is sufficient to preclude withdrawal of the mechanical element.

* * * * *